United States Patent [19]

Hosono et al.

[11] Patent Number: 5,617,772
[45] Date of Patent: Apr. 8, 1997

[54] LINEAR ACTUATOR

[75] Inventors: Masayuki Hosono; Yoshiteru Ueno, both of Ibaraki-ken, Japan

[73] Assignee: SMC Kabushiki Kaisha, Tokyo, Japan

[21] Appl. No.: 536,605

[22] Filed: Sep. 29, 1995

[30] Foreign Application Priority Data

Sep. 30, 1994 [JP] Japan .................................. 6-237415
Sep. 12, 1995 [JP] Japan .................................. 7-234390

[51] Int. Cl.$^6$ .................................................. F01B 15/02
[52] U.S. Cl. ........................ 92/117 A; 92/5 R; 92/13.5; 92/13.7; 92/165 R; 92/138
[58] Field of Search ................. 92/5 R, 13.5, 13.7, 92/88, 165 R, 146, 106, 138, 117 A

[56] References Cited

U.S. PATENT DOCUMENTS

| 3,152,520 | 10/1964 | Heese ........................................ 92/138 |
| 4,141,432 | 2/1979 | Presley .................................. 92/117 A |
| 4,403,389 | 9/1983 | Coope . |
| 5,305,682 | 4/1994 | Kaweko .................................... 92/5 R |
| 5,305,683 | 4/1994 | Gospowski et al. ...................... 92/5 R |
| 5,330,272 | 7/1994 | Stoll ........................................... 92/88 |
| 5,335,583 | 8/1994 | Kaweko et al. ......................... 92/13.7 |
| 5,415,437 | 5/1995 | Asou et al. . |

FOREIGN PATENT DOCUMENTS

| 0112985 | 7/1984 | European Pat. Off. . |
| 0113790 | 7/1984 | European Pat. Off. . |
| 0533922 | 3/1993 | European Pat. Off. . |
| 50976 | 11/1966 | Germany . |
| 244934 | 4/1987 | Germany . |
| 542716 | 6/1993 | Japan . |
| 2140087 | 11/1984 | United Kingdom . |

*Primary Examiner*—Thomas E. Denion
*Attorney, Agent, or Firm*—Oblon, Spivak, McClelland, Maier & Neustadt, P.C.

[57] ABSTRACT

A linear actuator has an actuator body having a through hole defined axially therein and an opening defined in an upper surface thereof, a pair of end blocks, a slide table reciprocally movable in the directions indicated by the arrows X, Y, a pair of cylindrical members coupled to the end blocks, respectively, and having respective passages communicating with fluid outlet/inlet ports, respectively, defined in the actuator body, a joint member movable in unison with the slide table, a pair of cover members held in surface-to-surface contact with the joint member in confronting relation to each other and hermetically surrounding outer circumferential surfaces of the cylindrical members, for sliding displacement in unison with the slide table, and a pair of pressure chambers defined by the cylindrical members and the cover members and closed by the cover members, the pressure chambers communicating with passages in the cylindrical members.

11 Claims, 18 Drawing Sheets

5,617,772

LINEAR ACTUATOR

BACKGROUND OF THE INVENTION

1. Field of the Invention

The present invention relates to a linear actuator responsive to a pressure fluid introduced from fluid outlet/inlet ports for reciprocally moving a slide table in an axial direction of an actuator body.

2. Description of the Related Art

Linear actuators have heretofore been used as means for conveying workpieces or the like. Linear actuators are capable of linearly reciprocally moving a movable table along a cylinder body for thereby conveying a workpiece placed on the movable table.

One known linear actuator is disclosed in Japanese laid-open utility model publication No. 5-42716, for example. FIG. 19 of the accompanying drawings illustrates the disclosed linear actuator in the form of a fluid pressure cylinder assembly. As shown in FIG. 19, the fluid pressure cylinder assembly comprises a cylinder body 1, a pair of cylinder chambers 2, 3 defined in the cylinder body 1 in a horizontal juxtaposed array, an oblong hole 4 defined in the cylinder body 1 between the cylinder chambers 2, 3 in communication therewith and opening at an upper surface of the cylinder body 1, the oblong hole 4 having a longitudinal axis parallel to the horizontal juxtaposed array of cylinder chambers 2, 3, a pair of pressure supply ports (not shown) communicating with the cylinder chambers 2, 3, respectively, a pair of pistons 5, 6 reciprocally movably inserted in the respective cylinder chambers 2, 3 for simultaneous movement in the same direction, a rod 7 sandwiched between and held in linear, but not bonded, contact with the pistons 5, 6 and having a vertical central axis, for movement in the oblong hole 4 in unison with the pistons 5, 6, a table 18 placed over the cylinder body 1 and connected to an upper end of the rod 7, a circulatory ball bearing (not shown) disposed in the table 18, and a track groove (not shown) defined in the cylinder body 1 and engaging the circulatory ball bearing. The linear actuator also has a pair of end covers 8, 9 mounted respectively in the opposite horizontal ends of the cylinder body 1 and defining respective pressure chambers 14, 15 in the cylinder chambers 2, 3 together with the pistons 5, 6, respectively.

In the conventional fluid pressure cylinder assembly shown in FIG. 19, the cylinder chambers 2, 3 in which the respective pistons 5, 6 are reciprocally movable are formed by a through hole defined in the cylinder body 1. The cylinder body 1, which serves as a guide member for the circulatory ball bearing, is required to be made of a highly hard material that is highly resistant to wear due to frictional contact with the circulatory ball bearing. Generally, the high hardness requirements imposed on the cylinder body 1 are met by making the cylinder body 1 of steel and heat-treating the cylinder body 1. Since, however, the cylinder chambers 2, 3 are deformed by the heat treatment, the cylinder body 1 needs to be machined to removes the strains of the cylinder chambers 2, 3 after it has been heat-treated. As a result, the process of manufacturing the conventional fluid pressure cylinder assembly has been complex, and hence the cost of the conventional fluid pressure cylinder assembly is high.

In the conventional fluid pressure cylinder assembly, reciprocating movement of the pistons 5, 6 is transmitted to the table 18 through the rod 7 which is sandwiched between and held in linear, but not bonded, contact with the pistons 5, 6. Therefore, when a large load is posed on the table 18 due to the weight of a workpiece placed thereon, the load is transmitted to the joined regions between the pistons 5, 6 and the rod 7 which extend perpendicularly to each other. Inasmuch as the rod 7 is sandwiched between and held in linear, but not bonded, contact with the pistons 5, 6, the contact surfaces of the pistons 5, 6 and the rod 7 are worn relatively rapidly in usage over a long period of time, resulting in a reduction in the accuracy with which the table 18 moves.

SUMMARY OF THE INVENTION

It is a general object of the present invention to provide a linear actuator which can be manufactured in a relatively simple, inexpensive process, and has an increased degree of durability without an undue reduction in the accuracy with which a slide table moves.

Another object of the present invention is to provide a linear actuator which is made up of a reduced number of parts and can be manufactured inexpensively because end blocks and tubular members are integrally formed with each other.

Still another object of the present invention is to provide a linear actuator in which a rail member with sensor attachment grooves defined therein can selectively and detachably be mounted on one of confronting side surfaces of an actuator body.

Yet still another object of the present invention is to provide a linear actuator which allows sensors mounted in sensor attachment grooves to have increased detecting accuracy.

The above and other objects, features, and advantages of the present invention will become apparent from the following description when taken in conjunction with the accompanying drawings in which preferred embodiments of the present invention are by way of illustrative example.

DETAILED DESCRIPTION OF THE PREFERRED EMBODIMENTS

Figure 1:
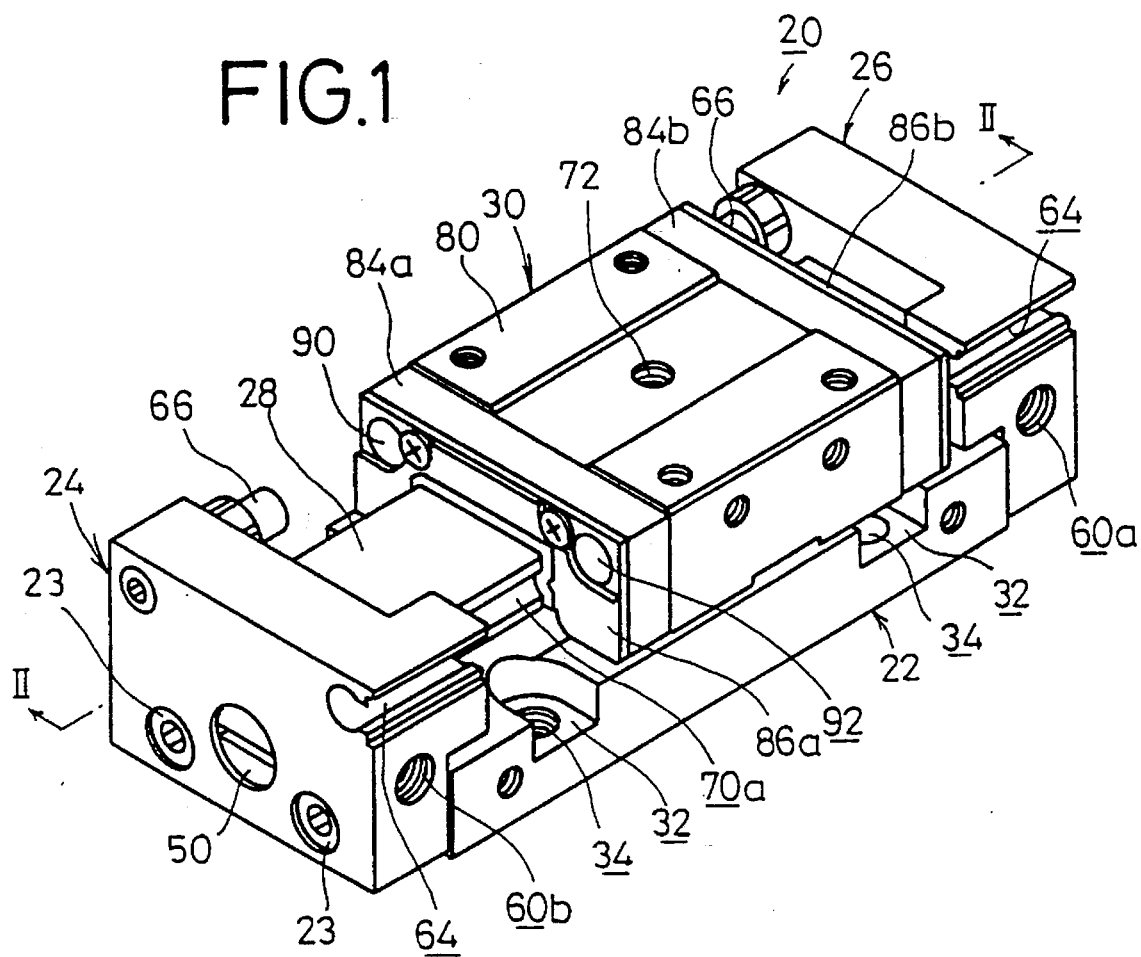
FIG. 1 is a perspective view of a linear actuator according to a first embodiment of the present invention.

FIG. 1 shows in perspective a linear actuator according to a first embodiment of the present invention.

As shown in FIG. 1, the linear actuator, generally designated by the reference numeral 20, generally comprises an actuator body 22 essentially in the form of a rectangular parallelepiped, a pair of end blocks 24, 26 securely fastened to longitudinal opposite ends of the actuator body 22 by screws 23, and a slide table 30 mounted for linear reciprocating movement along a guide base 28 projecting upwardly from and integrally formed with a central portion of the actuator body 22.

Figure 5:
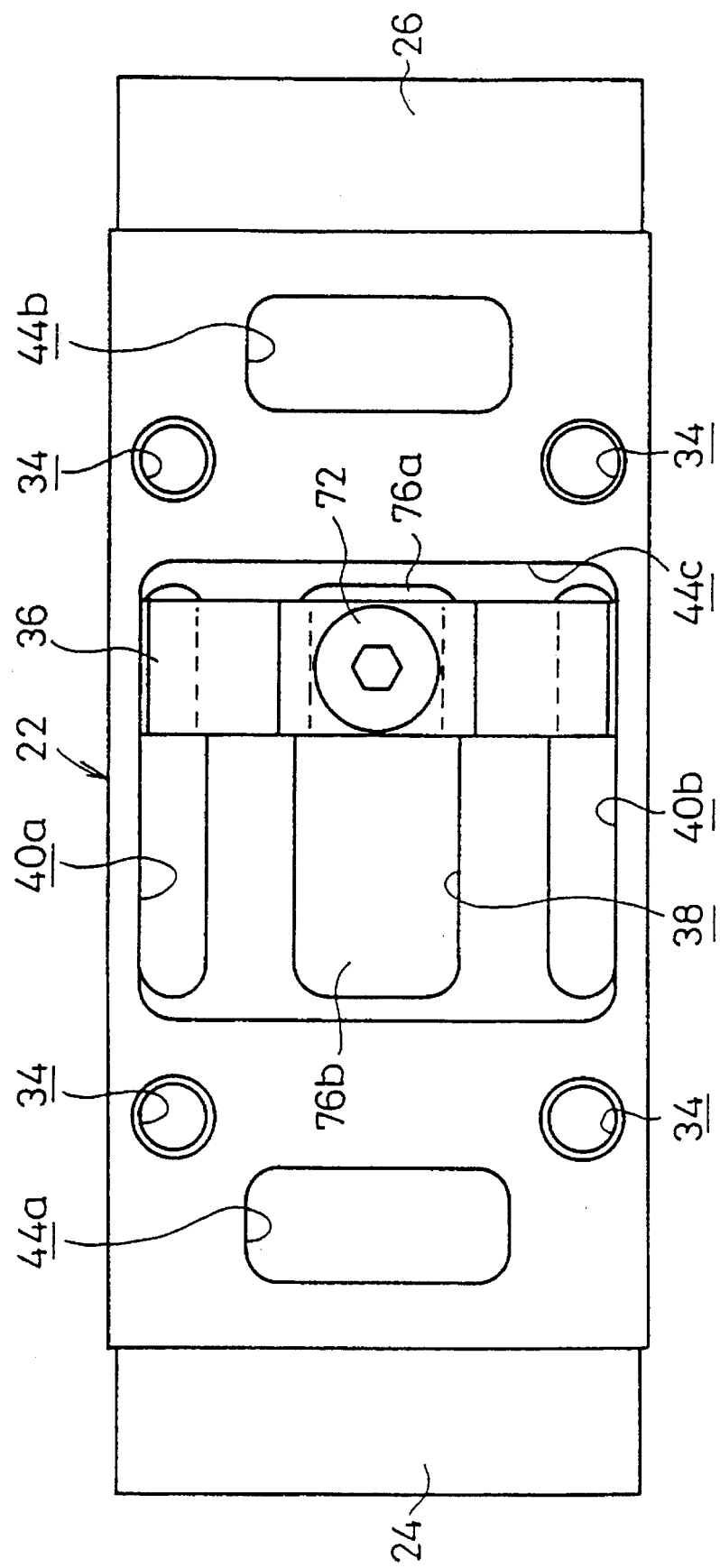
FIG. 5 is a bottom view of the linear actuator shown in FIG. 1.

The actuator body 22 has four substantially semielliptical recesses 32 defined in an upper surface thereof in longitudinally and transversely spaced relation to each other, and four attachment holes 34 defined in the respective bottoms of the recesses 32 and extending to a lower surface of the actuator body 22. The guide base 28 has a longitudinally elongate rectangular opening 38 (see FIGS. 2 and 6) defined therein in which a joint member 36 (described later on) is freely movable horizontally. The actuator body 22 has a pair of laterally spaced longitudinally elongate rectangular guide holes 40a, 40b (see FIG. 3) defined in respective side portions thereof and disposed one on each side of and extending substantially parallel to the opening 38. The joint member 36 has a pair of lateral edge portions 42 engaging in the respective guide holes 40a, 40b for being guided thereby. As shown in FIG. 5, the actuator body 22 also has a pair of transversely rectangular windows 44a, 44b and a substantially square window 44c which are defined in the lower surface thereof. A through hole 46 (see FIGS. 2 and 3) is defined in the actuator body 22 along the longitudinal axis thereof in communication with the opening 38, the guide holes 40a, 40b, and the windows 44a, 44b, 44c. The through hole 46 includes a pair of circular portions of substantially circular cross section defined respectively in the axial ends of the actuator body 22, and a cavity defined substantially centrally in the actuator body 22.

Figure 2:
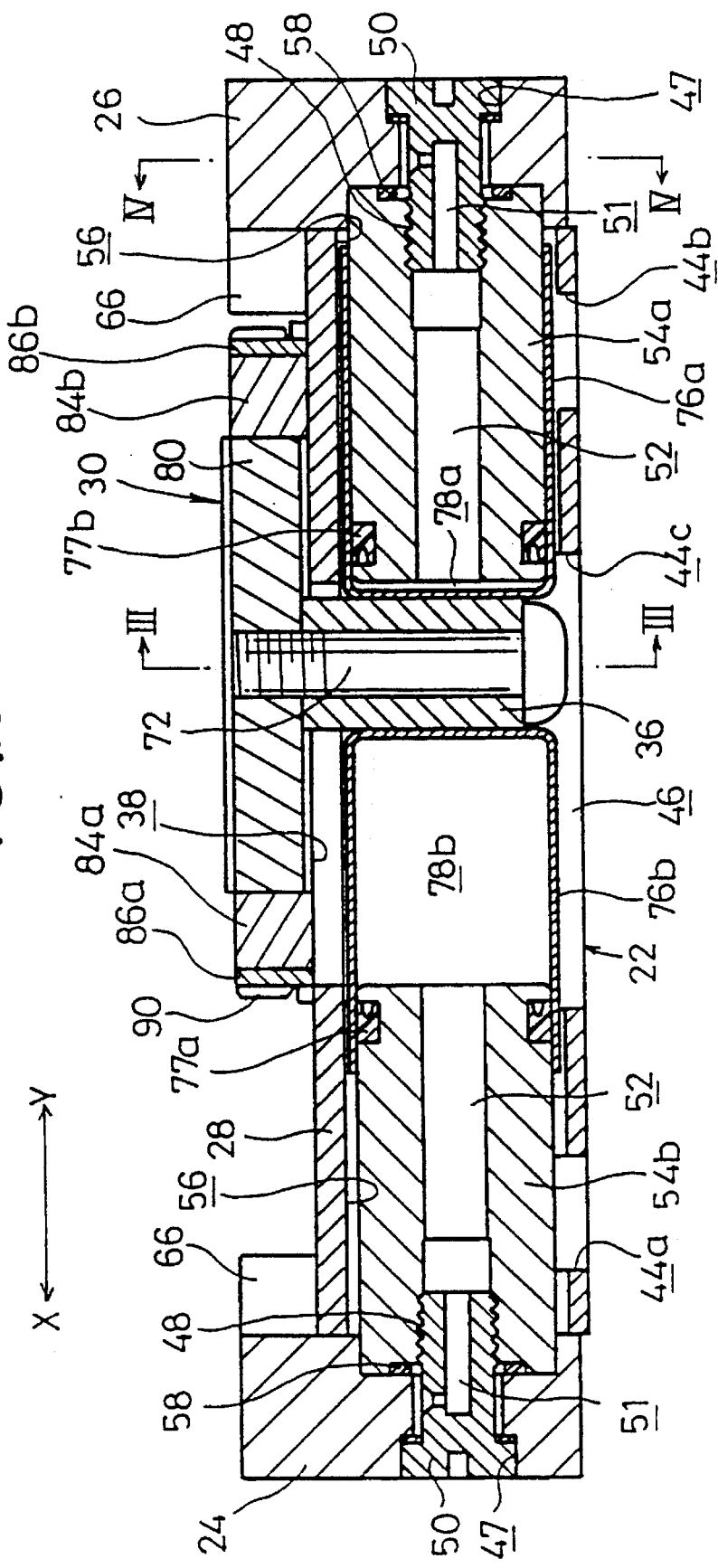
FIG. 2 is a cross-sectional view taken along line II—II of FIG. 1.

As shown in FIG. 2, the end blocks 24, 26 have respective holes 47 extending therethrough in the axial direction of the actuator body 22. The holes 47 are closed off by respective plugs 50 each having an externally threaded tip end portion 48. The plugs 50 have respective passages 51 defined centrally therein along their respective axes and held in communication with fluid outlet/inlet ports 60a, 60b defined in side surfaces of the end blocks 24, 26. In the circular portions of the through hole 46 defined in the actuator body 22, there is disposed a pair of cylindrical members 54a, 54b, respectively, each having a diameter slightly smaller than the diameter of the through hole 46 and having a passage 52 defined axially therethrough. The passages 52 in the cylindrical members 54a, 54b are held in communication with the respective passages 51 in the plugs 50 whose externally threaded tip end portions 48 are threaded into the respective passages 52.

Specifically, the cylindrical members 54a, 54b are coupled to and supported on the respective end blocks 24, 26 by the plugs 50. The cylindrical members 54a, 54b have respective outer circumferential surfaces kept out of contact with, i.e., spaced from, an inner wall surface of the actuator body 22 which define the through hole 46 therein, thus defining annular clearances 56 of given spacing around the cylindrical members 54a, 54b. Ring-shaped seals 58 are disposed between the cylindrical members 54a, 54b and the end blocks 24, 26 around the plugs 50 to hermetically seal the joints between the cylindrical members 54a, 54b and the plugs 50. The fluid outlet/inlet ports 60a, 60b defined in side surfaces of the end blocks 24, 26 are held in communication with the passages 51 in the plugs 50 through respective passages 62 (see FIG. 4).

Figure 6:
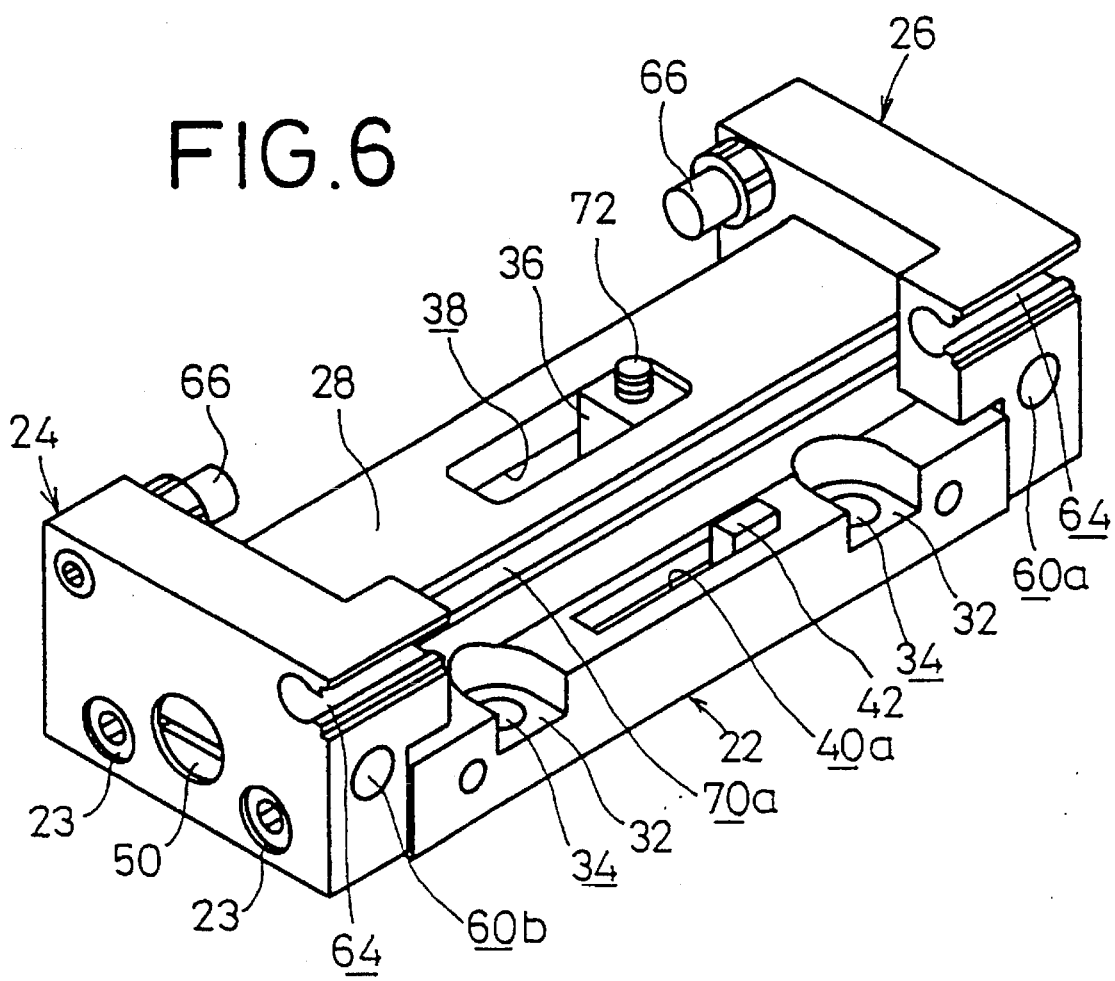
FIG. 6 is a perspective view of the linear actuator shown in FIG. 1 with a slide table omitted from illustration.

As shown in FIGS. 1 and 6, the end blocks 24, 26 have sensor attachment grooves 64, respectively, defined in the side surfaces thereof for installing sensors (not shown) such as automatic switches or the like. The sensor attachment grooves 64 extend substantially parallel to the axis of the actuator body 22 and have a predetermined length. As shown in FIG. 1, adjustment screws 66 are attached respectively to the end blocks 24, 26 and project toward each other for adjusting the distance which the slide table 30 can move along the guide base 28.

A plurality of ball bearings 68 (see FIGS. 3 and 7) are interposed between the slide table 30 and the guide base 28 for smoothly reciprocally moving the slide table 30 along the guide base 28. The ball bearings 68 comprise balls which roll along track grooves 70a, 70b defined respectively in confronting inner wall surfaces of the guide base 28 and the slide table 30 and circulate through circulation holes 71 defined in the slide table 30.

Figure 3:
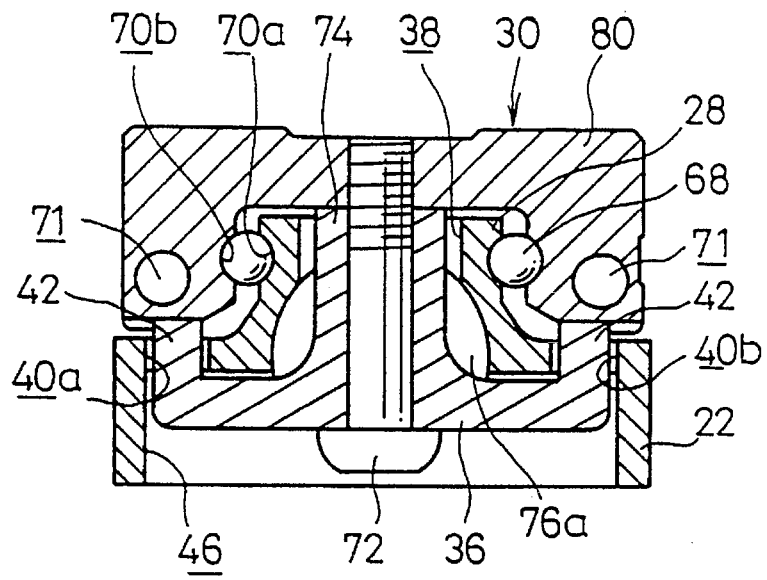
FIG. 3 is a cross-sectional view taken along line III—III of FIG. 2.

As shown in FIG. 3, the joint member 36 is fastened to a lower surface of the slide table 30 by a bolt 72. Specifically, the joint member 36 has a central boss 74 extending upwardly through the opening 38 in the guide base 28 and fastened securely to the lower surface of the slide table 30 by the bolt 72. The lateral edge portions 42 of the joint member 36, which are positioned one on each side of the central boss 74, are bent upwardly and project from the guide holes 40a, 40b of the actuator body 22 into abutment against the lower surface of the slide table 30. As illustrated in FIG. 2, a pair of confronting cover members 76a, 76b, each extending in the axial direction of the through hole 46 and having a C-shaped cross section, is disposed on respective opposite side wall surfaces of the joint member 36 that extends perpendicularly to the slide table 30. The joint member 36 is sandwiched between and held in surface-to-surface contact with, but not bonded to, the cover members 76a, 76b. The cover members 76a, 76b serve to hermetically surround the outer circumferential surfaces of the cylindrical members 54a, 54b in coaction with seal members 77a, 77b mounted respectively on the cylindrical members 54a, 54b. The cover members 76a, 76b are movable back and forth in the directions indicated by the arrows X, Y along the axes of the cylindrical members 54a, 54b. The cylindrical members 54a, 54b are not limited to a cylindrical shape, but may be of a tubular shape, and accordingly the cover members 76a, 76b may be of a tubular shape capable of surrounding the outer circumferential surfaces of such tubular members 54a, 54b.

The cover members 76a, 76b and the tubular members 54a, 54b jointly define pressure chambers 78a, 78b therebetween which have respective diameters corresponding to those of the tubular members 54a, 54b, the pressure chambers 78a, 78b communicating with the respective passages 52 in the tubular members 54a, 54b. When a fluid under pressure is introduced into the pressure chambers 78a, 78b through the respective passages 52, the introduced fluid pushes inner wall surfaces of the cover members 76a, 76b. Therefore, the cover members 76a, 76b are slidingly displaced along the annular clearances 56 that are defined by the outer circumferential surfaces of the cylindrical members 54a, 54b and the inner wall surface of the actuator body 22 which define the through hole 46. When the cover members 76a, 76b are displaced along the outer circumferential surfaces of the cylindrical members 54a, 54b, the slide table 30 is moved in the direction indicated by the arrow X or Y by the joint member 36 which is sandwiched between the cover members 76a, 76b held in surface-to-surface contact therewith.

Figure 7:
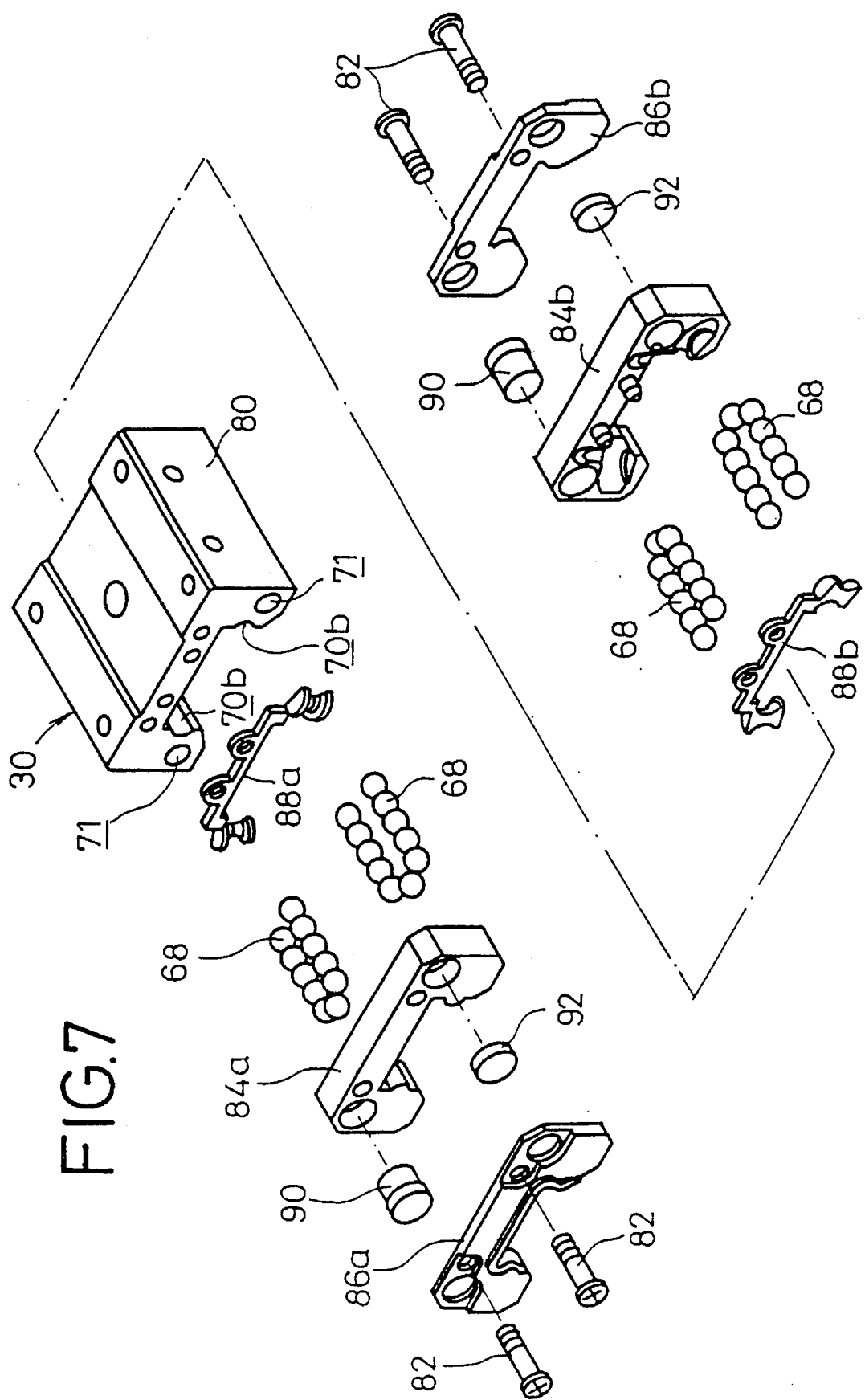
FIG. 7 is an exploded perspective view of the slide table of the linear actuator shown in FIG. 1.

As shown in FIG. 7, the slide table 30 comprises a table block 80 of substantially inserted channel-shaped cross section, and a pair of end covers 84a, 84b and a pair of scrapers 86a, 86b that are fastened to opposite ends of the table block 80, which are spaced from each other in the direction in which the slide table 30 is movable, by screws 82. The circulation holes 71 are defined in the table block 80, and the balls of the ball bearings 68 roll along the track grooves 70a, 70b and circulate through the circulation holes 71. A pair of return guides 88a, 88b is mounted on the respective opposite ends of the table block 80 for guiding the balls of the ball bearings 68 as they roll along the track grooves 70a, 70b and circulate through the circulation holes 71. Shock absorbers or dampers 90 are mounted on the respective end covers 84a, 84b for dampening shocks produced when the slide table 30 hit the adjustment screws 66 at an end of the stroke of the slide table 30. Magnets 92 are also mounted on the respective end covers 84a, 84b for detecting the position of the slide table 30 in coaction with sensors (not shown) mounted in the sensor attachment grooves 64.

Operation and advantages of the linear actuator 20 according to the first embodiment of the present invention will be described below.

Figure 4:
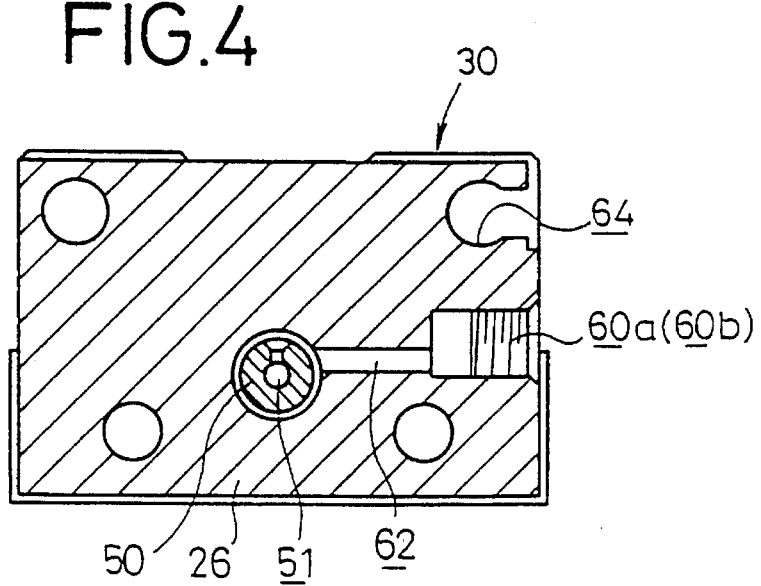
FIG. 4 is a cross-sectional view taken along line IV—IV of FIG. 2.

A fluid under pressure is supplied through the passage 62 communicating with the fluid outlet/inlet port 60a into the passage 51 in the corresponding plug 50 (see FIG. 4). As shown in FIG. 2, the fluid under pressure is then introduced through the passage 52 in the cylindrical member 51a communicating with the passage 51 into the pressure chamber 78a closed by the cover member 76a, pushing the inner wall surface of the cover member 76a. The cover member 76a thus pushed by the fluid under pressure is slidingly displaced in the direction indicated by the arrow X away from the cylindrical member 54a while the pressure chamber 78a is being hermetically sealed by the seal member 77a. As a result, the slide table 30 is moved in the direction indicated by the arrow X by the joint member 36 which is sandwiched between the cover members 76a, 76b held in surface-to-surface contact therewith. Since the pressure chamber 78b closed by the cover member 76b is vented to the atmosphere, at this time, the cover member 76b moves toward the cylindrical member 54b along the outer circumferential surface thereof. When one of the shock absorbers 90 engages the corresponding adjustment screw 66, the slide table 30 reaches an end of its stroke of movement in the direction indicated by the arrow X. The position of the slide table 30 is detected when the sensor (not shown) mounted in one of the sensor attachment grooves 64 detects magnetic fluxes from the corresponding magnet 92.

For moving the slide table 30 in the opposite direction, a fluid under pressure is supplied to the other fluid outlet/inlet port 60b. The supplied fluid under pressure is introduced through the passage 52 in the cylindrical member 54b into the pressure chamber 78b, and pushes the inner wall surface of the cover member 76b, moving the cover member 76b in the direction indicated by the arrow Y. As a consequence, the slide table 30 is moved in the direction indicated by the arrow Y by the joint member 36 sandwiched between the cover members 76a, 76b. Other details of the movement of the slide table 30 in the direction indicated by the arrow Y are the same as those of the movement of the slide table 30 in the direction indicated by the arrow X, and will not be described in detail.

In the linear actuator 20 according to the first embodiment, the guide base 28 and the actuator body 22 are integrally formed with each other, the end blocks 24, 26 to which the cylindrical members 54a, 54b are coupled are inserted in the through hole 46 defined in the actuator body 22, and the cover members 76a, 76b held in surface-to-surface contact with the joint member 36 are held in engagement with the respective cylindrical members 54a, 54b. Therefore, the linear actuator 20 can be manufactured relatively easily and inexpensively.

The joint member 36, which is of large wall thickness, is integrally coupled to the slide table 30 by the bolt 72 for high rigidity, and sandwiched between and held in surface-to-surface contact with, but not bonded to, the cover members 76a, 76b. Even when a large load is imposed on the slide table 30, the slide table 30 and the joint member 36 remain firmly joined to each other at their junction to which the load is transmitted. Because the joint member 36 and the cover members 76a, 76b are held against each other through relatively large areas of contact, the contact surfaces of the joint member 36 and the cover members 76a, 76b are prevented from being worn rapidly. As a result, the accuracy with which the slide table 30 moves is not lowered in usage over a long period of time, and hence the slide table 30 has large durability.

A linear actuator 100 according to a second embodiment of the present invention will be described below with reference to FIGS. 8 through 12. Those parts of the linear actuator 100 which are identical to those of the linear actuator 20 according to the first embodiment of the present invention are denoted by identical reference numerals, and will not be described in detail below.

Figure 8:
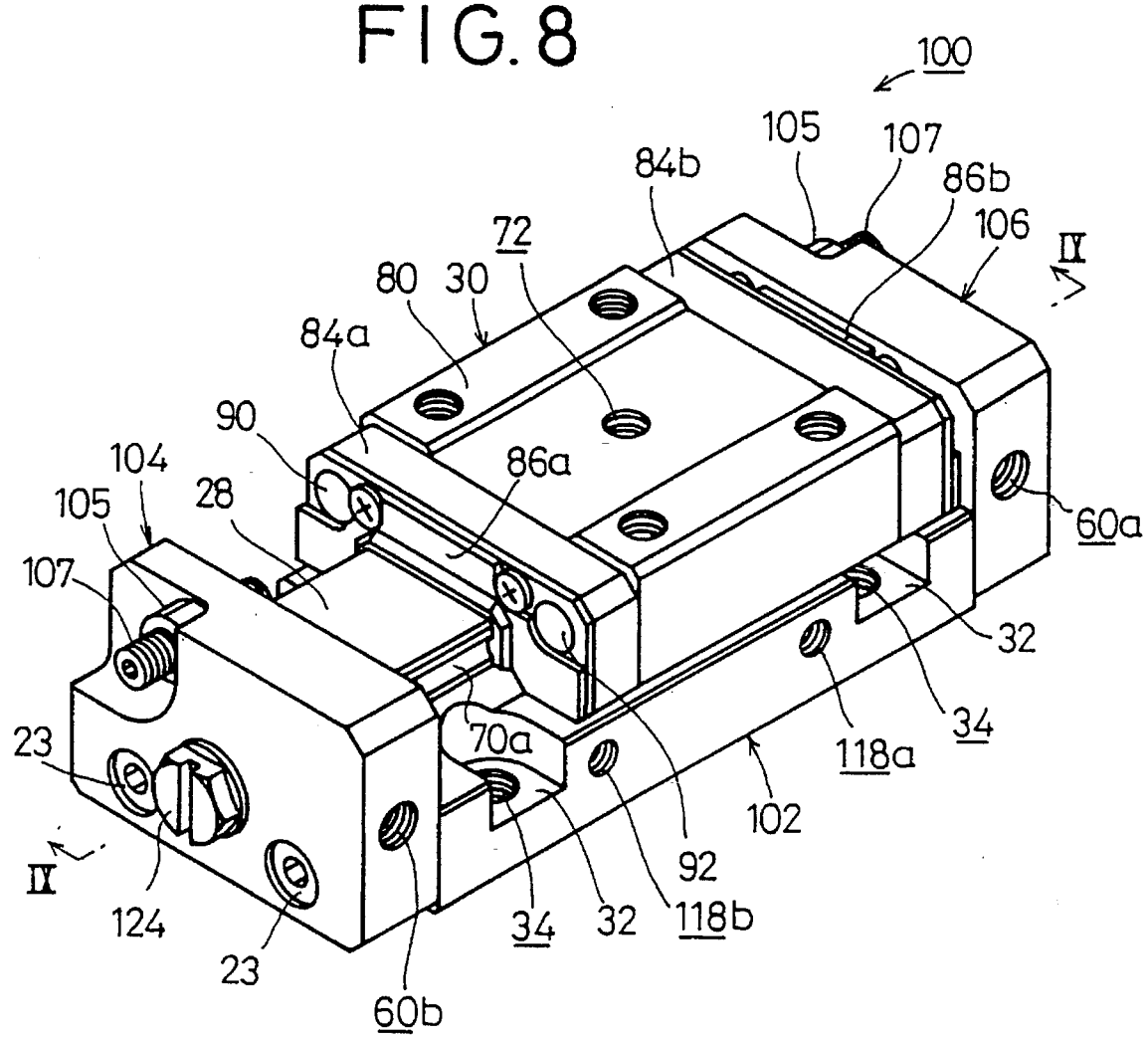
FIG. 8 is a perspective view of a linear actuator according to a second embodiment of the present invention.

As shown in FIG. 8, the linear actuator 100 comprises an actuator body 102 essentially in the form of a rectangular parallelepiped, a pair of end blocks 104, 106 securely fastened to longitudinal opposite ends of the actuator body 102 by screws 23, and a slide table 30 mounted for linear reciprocating movement along a guide base 28 projecting upwardly from and integrally formed with a central portion of the actuator body 102. The end blocks 104, 106 have respective stoppers 107 on corners thereof for engaging respective shock absorbers 90 to limit the displacement of the slide table 30 and adjusting the stroke of movement of the slide table 30 by turning nuts 105 threaded over the stoppers 107.

Figure 9:
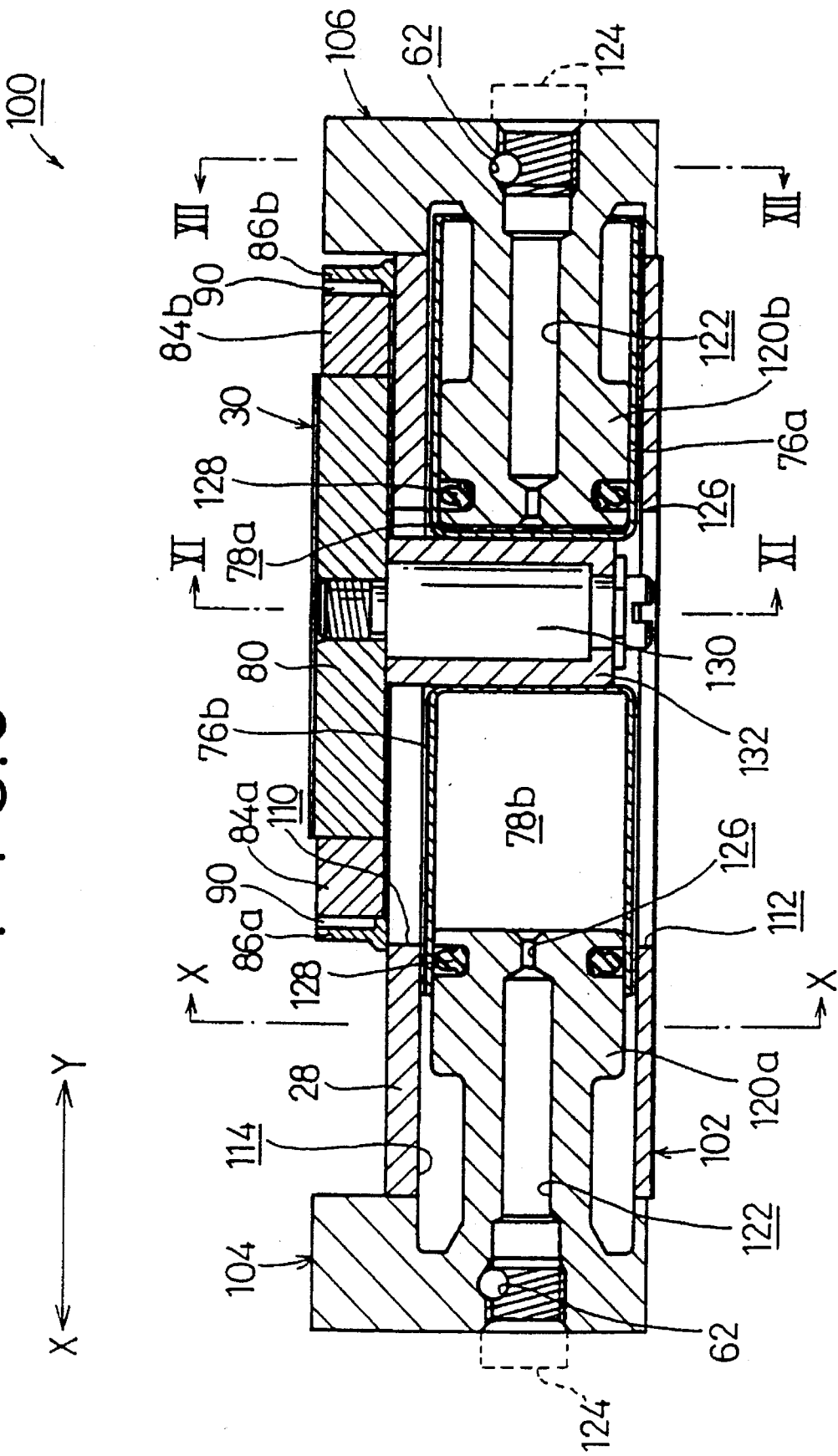
FIG. 9 is a cross-sectional view taken along line IX—IX of FIG. 8.
Figure 10:
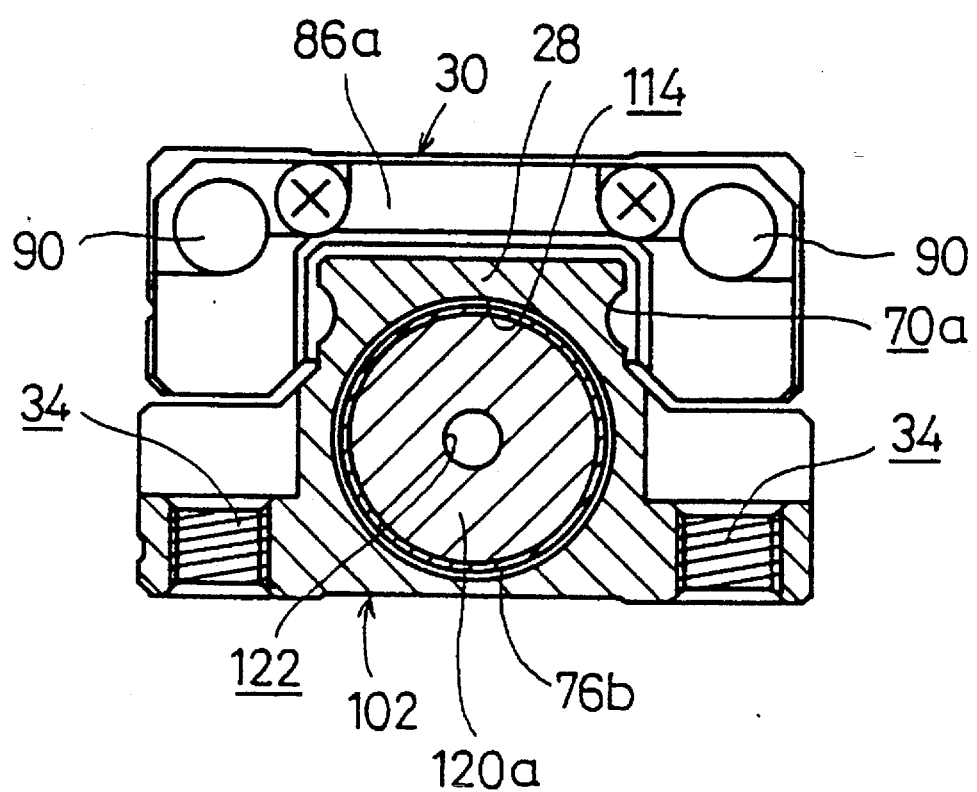
FIG. 10 is a cross-sectional view taken along line X—X of FIG. 9.

The actuator body 102 has four substantially semielliptical recesses 32 defined in an upper surface thereof in longitudinally and transversely spaced relation to each other, and four attachment holes 34 defined in the respective bottoms of the recesses 32 and extending to a lower surface of the actuator body 102. As shown in FIG. 9, the actuator body 102 has a first longitudinally elongate rectangular opening 110 defined in an upper surface in which a joint member 132 is freely movable horizontally, and a second longitudinally elongate rectangular opening 110 defined in a lower surface thereof in alignment with the first longitudinally elongate rectangular opening 110. A through hole 114 (see FIG. 107 of substantially circular cross section is defined in the actuator body 102 in the axial direction thereof and held in communication with the first and second openings 110, 112. The actuator body 102 also has a pair of longitudinally spaced attachment holes 118a, 118b defined transversely in a side surfaced thereof for holding a rail 117 (see FIG. 15) which has a pair of sensor attachment grooves 116a, 116b (see FIG. 13) extending parallel to each other along the axis of the rail 117.

As shown in FIG. 9, cylindrical members 120a, 120b are integrally formed with the end blocks 104, 106, respectively, and extend in and along the through hole 114. The cylindrical members 120a, 120b have respective holes 122 defined therein along the axes thereof. The holes 122 have outer ends closed off by respective plugs 124 and inner ends connected to respective smaller-diameter orifices 126 communicating with pressure chambers 78a, 78b, respectively.

The end blocks 104,106 have respective fluid outlet/inlet ports 60a, 60b (see FIGS. 8 and 12) defined in side surfaces thereof and communicating with the holes 122 through respective passages 62 that extend substantially perpendicularly to the axis of the actuator body 102.

Seals 128 are fitted respectively in annular grooves defined in the outer circumferential surfaces of the cylindrical members 120a, 120b. The seals 128 are held in sliding contact with cover members 76a, 76b for hermetically sealing the pressure chambers 78a, 78b which are defined by the cover members 76a, 76b and the cylindrical members 120a, 120b.

As shown in FIG. 9, a fluid under pressure may be supplied to the pressure chambers 78a, 78b through the openings in the end blocks 104, 106 from which the plugs 124 are removed, rather than through the fluid outlet/inlet ports 60a, 60b.

Figure 11:
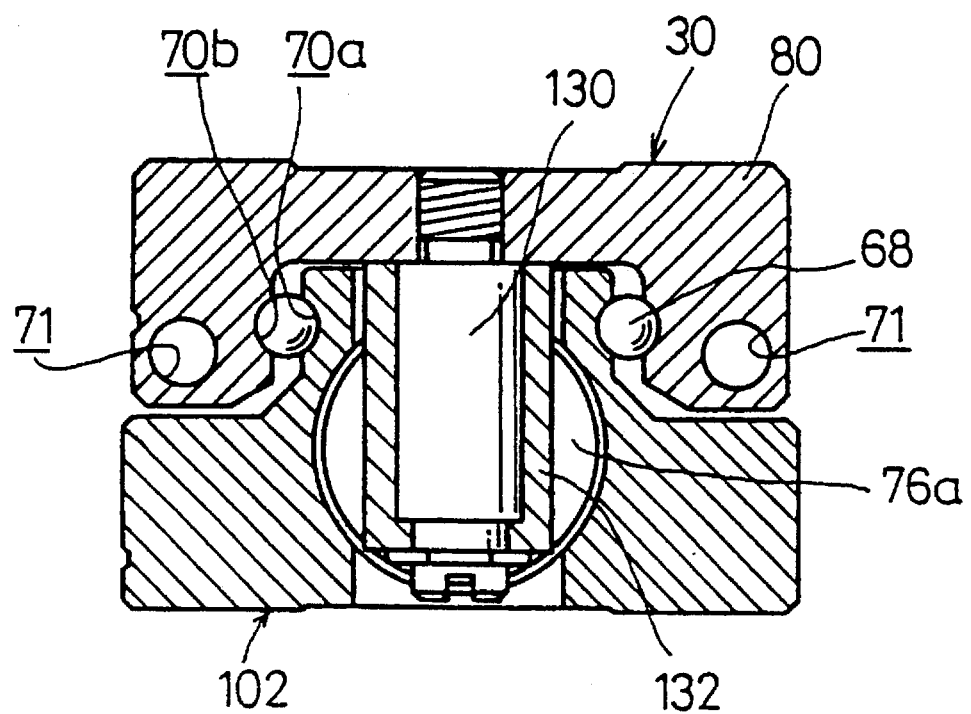
FIG. 11 is a cross-sectional view taken along line XI—XI of FIG. 9.
Figure 12:
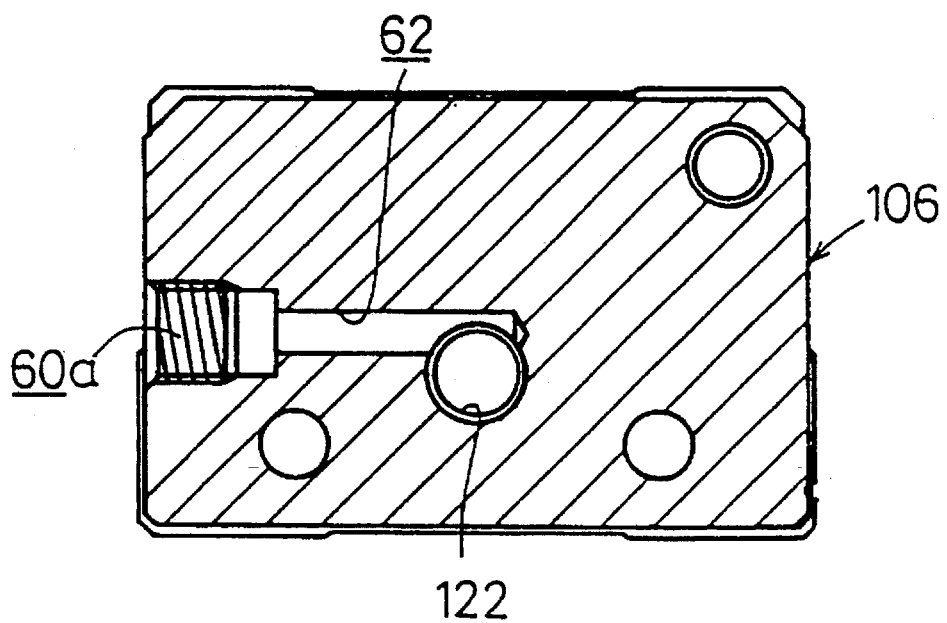
FIG. 12 is a cross-Sectional view taken along line XII—XII of FIG. 9.

As shown in FIG. 11, the joint member 132, which is in the form of a tubular member having a rectangular cross section, is securely joined to the lower surface of the slide table 30 by a bolt 130 threaded into the slide table 30. The cover members 76a, 76b, each extending in the axial direction of the through hole 114 and having a C-shaped cross section, are disposed on respective opposite side wall surfaces of the joint member 132 in confronting relation to each other, as shown in FIG. 9. The joint member 132 is sandwiched between and held in surface-to-surface contact with, but not bonded to, the cover members 76a, 76b. The cover members 76a, 76b are movable back and forth in the directions indicated by the arrows X, Y along the axes of the cylindrical members 120a, 120b under the pressure of a fluid supplied to the pressure chambers 120a, 120b.

The linear actuator 100 according to the second embodiment of the present invention is made up of a relatively small number of parts and can be manufactured relatively inexpensively because the end blocks 104, 106 and the cylindrical members 120a, 120b are integrally formed with each other. Other structural details, operation, and advantages of the linear actuator 100 according to the second embodiment of the present invention are the same as those of the linear actuator 20 according to the first embodiment of the present invention, and will not be described in detail below.

Figure 13:
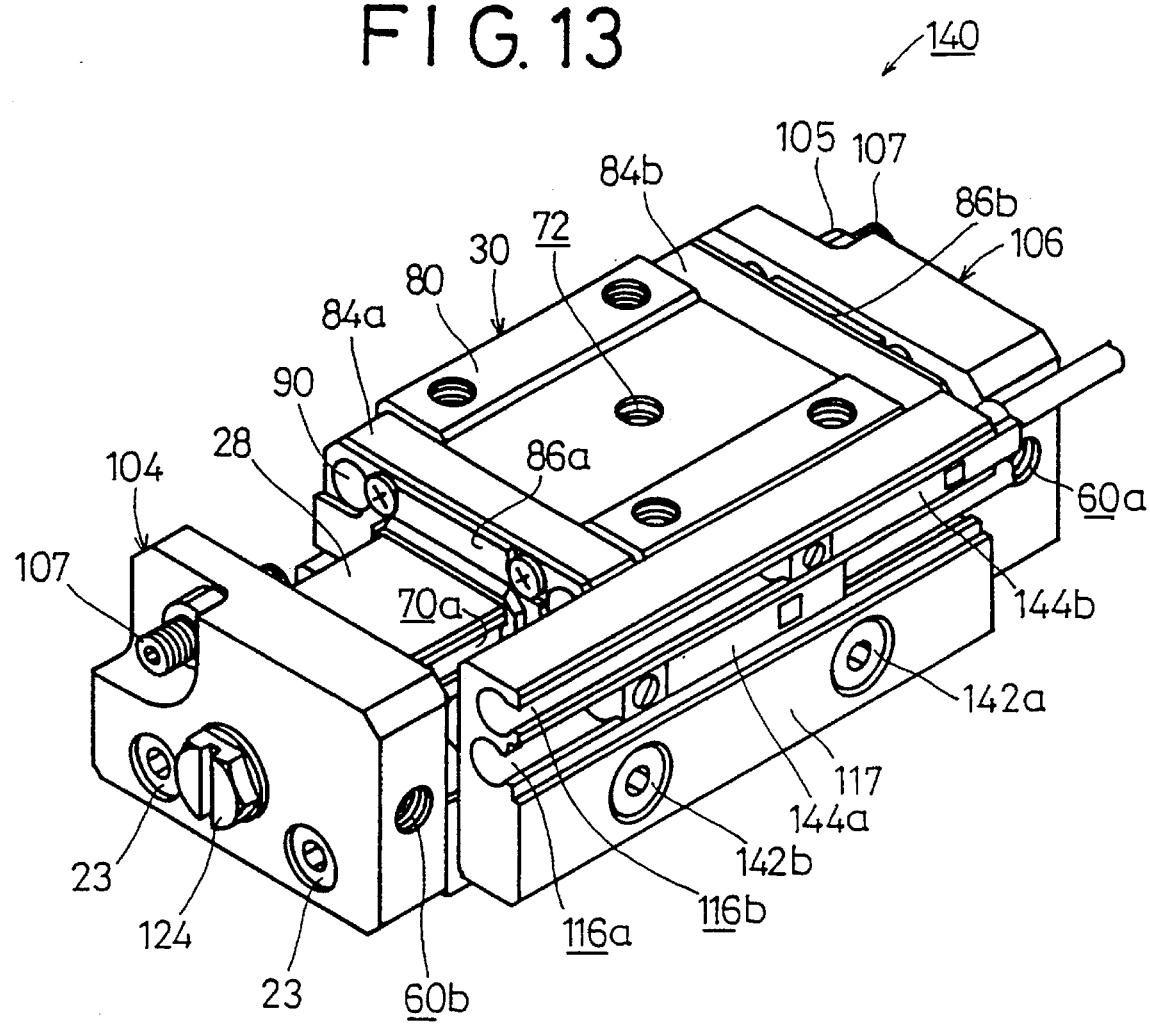
FIG. 13 is a perspective view of a linear actuator according to a third embodiment of the present invention.
Figure 14:
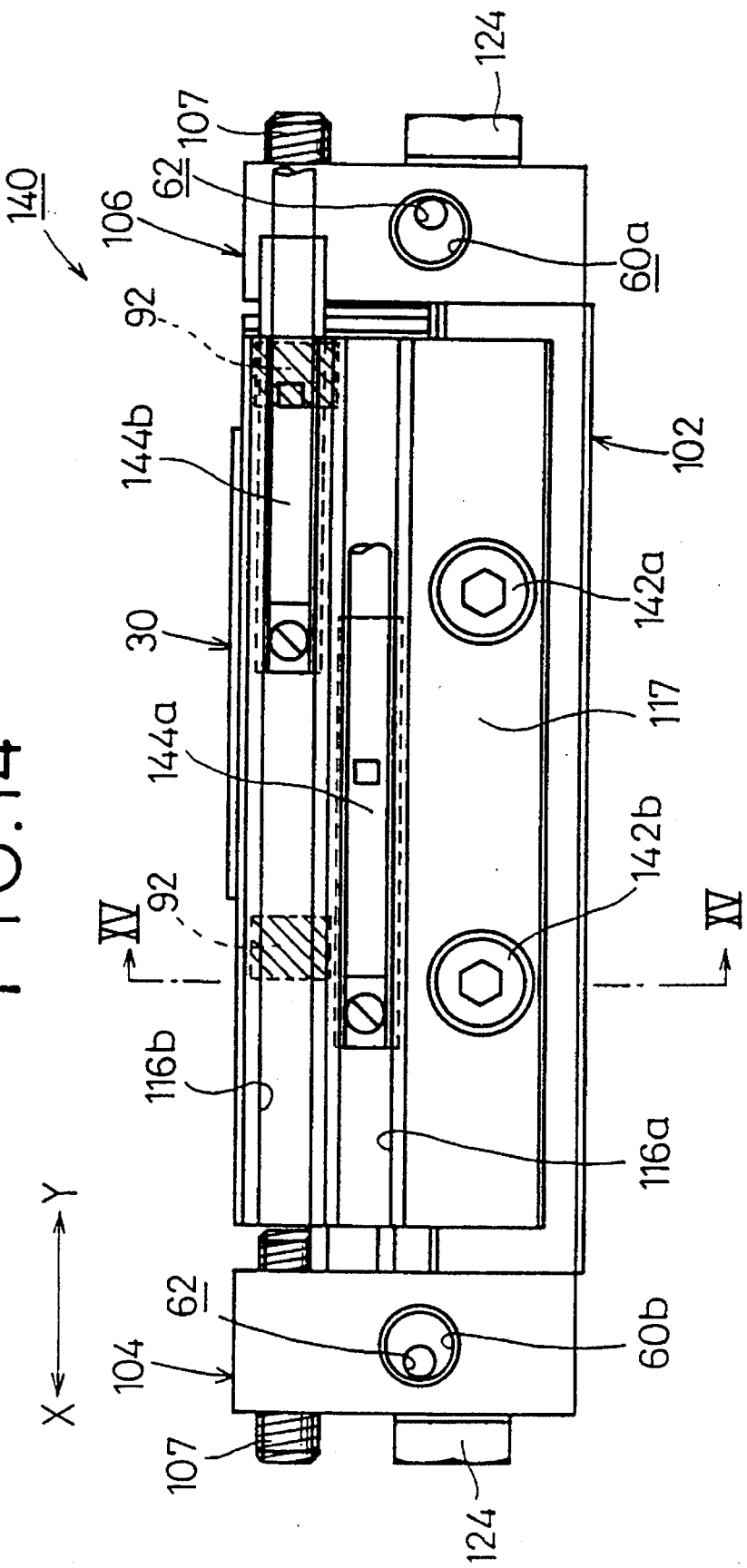
FIG. 14 is a side elevational view of the linear actuator shown in FIG. 13.
Figure 15:
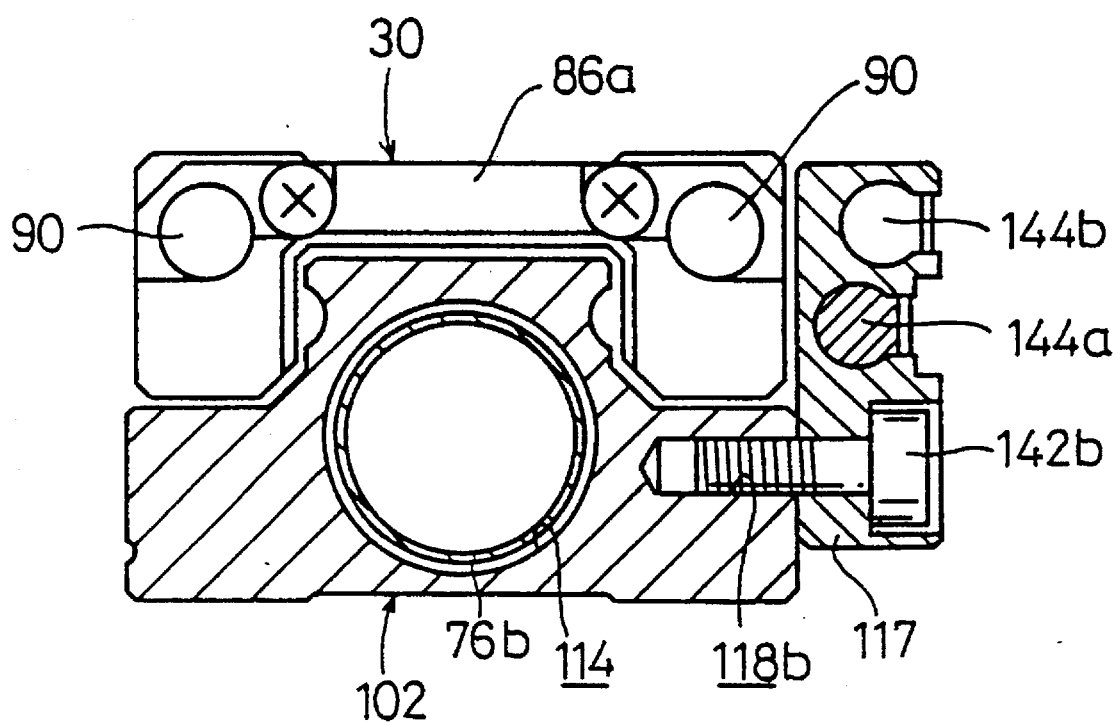
FIG. 15 is a cross-Sectional view taken along line XV—XV of FIG. 14.

A linear actuator 140 according to a third embodiment of the present invention will be described below with reference to FIGS. 13 through 15.

The linear actuator 140 according to the third embodiment of the present invention are substantially the same as the linear actuator 100 according to the second embodiment of the present invention except that a rail 117 having sensor attachment grooves 116a, 116b can selectively and detachably be fastened to one of side surfaces of an actuator body 102 by screws 142a, 142b threaded into attachment holes 118a, 118b defined in the actuator body 102.

Sensors 114a, 114b mounted in the respective sensor attachment grooves 116a, 116b at respective positions can detect magnetic fluxes from magnets 92 mounted on a slide table 30 to detect the position of the slide table 30. Other structural details, operation, and advantages of the linear actuator 140 according to the third embodiment of the present invention are the same as those of the linear actuator 100 according to the second embodiment of the present invention, and will not be described in detail below.

A linear actuator 150 according to a fourth embodiment of the present invention will be described below with reference to FIGS. 16 through 18.

Figure 16:
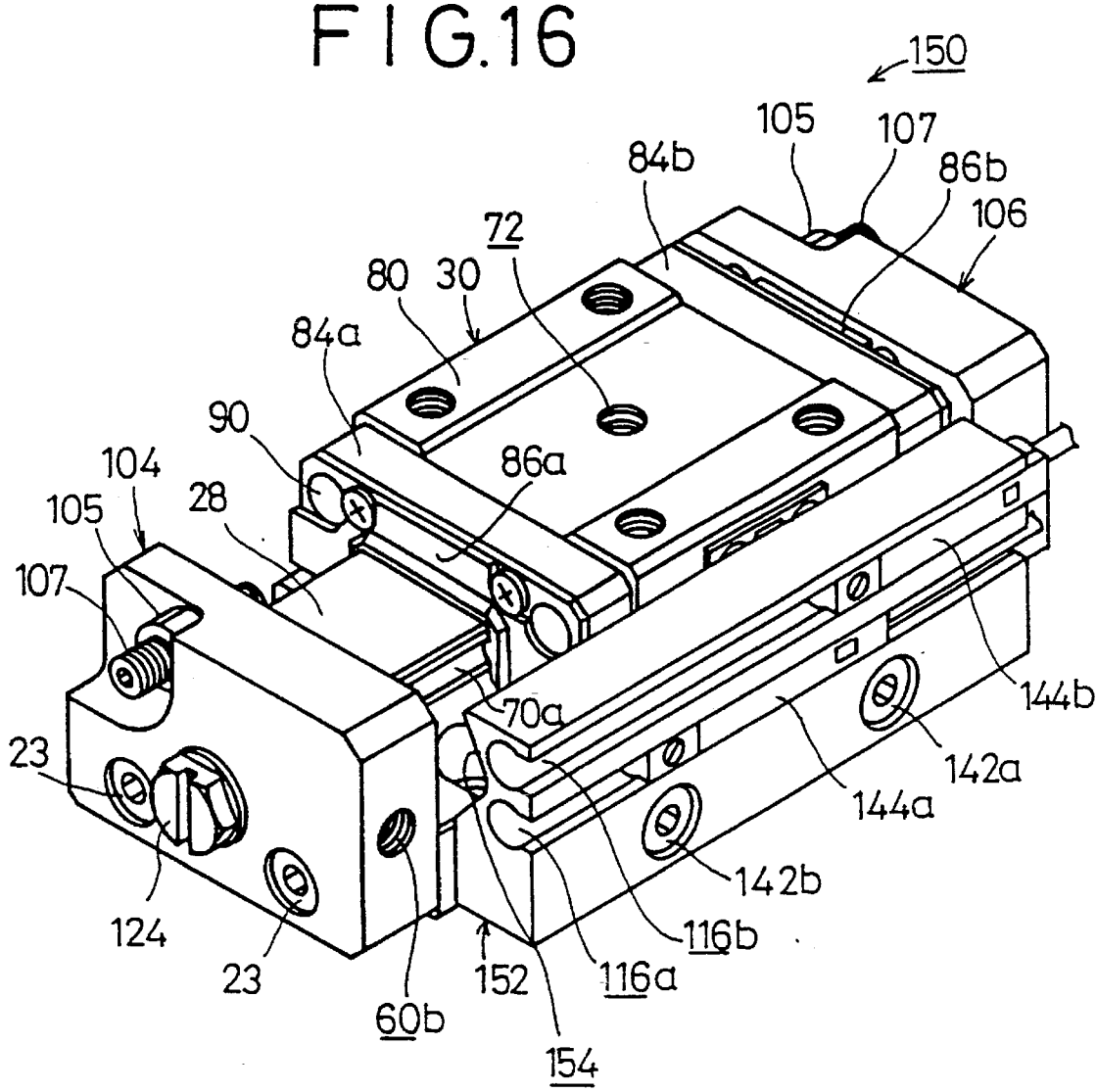
FIG. 16 is a perspective view of a linear actuator according to a fourth embodiment of the present invention.
Figure 17:
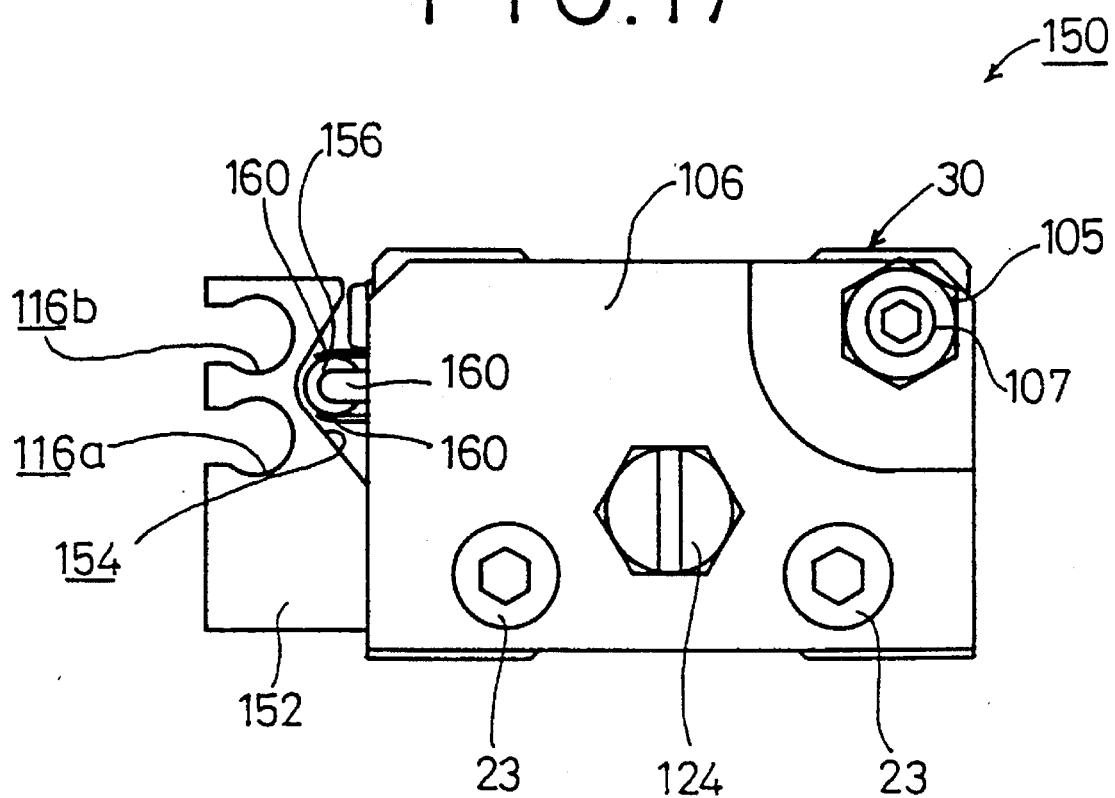
FIG. 17 is a side elevational view of the linear actuator shown in FIG. 16.
Figure 18:
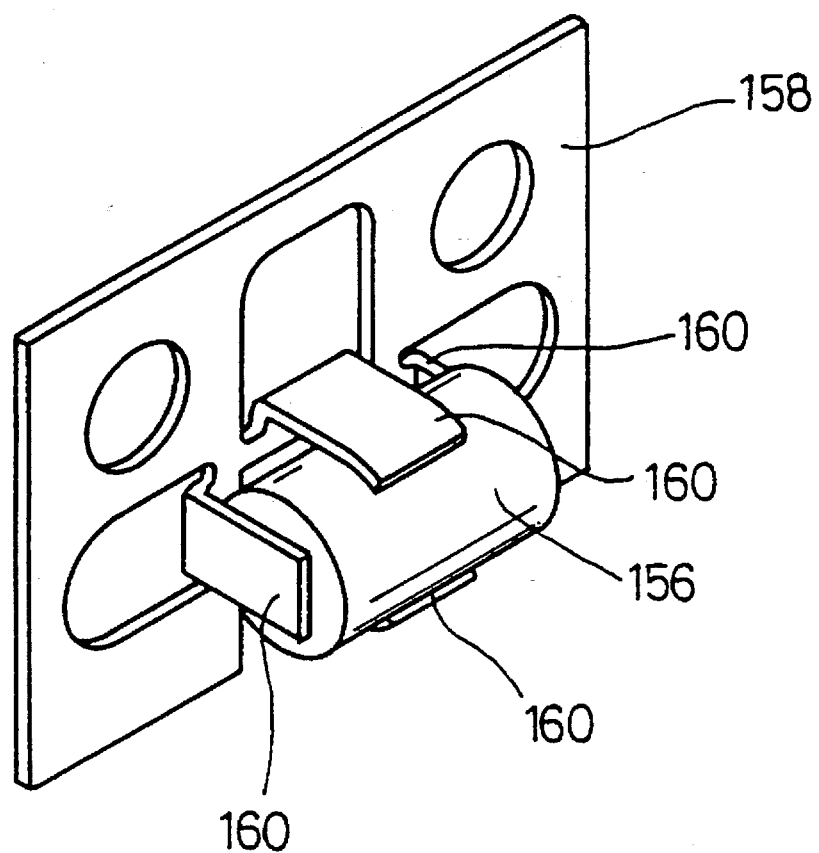
FIG. 18 is a perspective view of a bracket to be fastened to a side of a slide table of the linear actuator shown in FIG. 16, the bracket holding a magnet.
Figure 19:
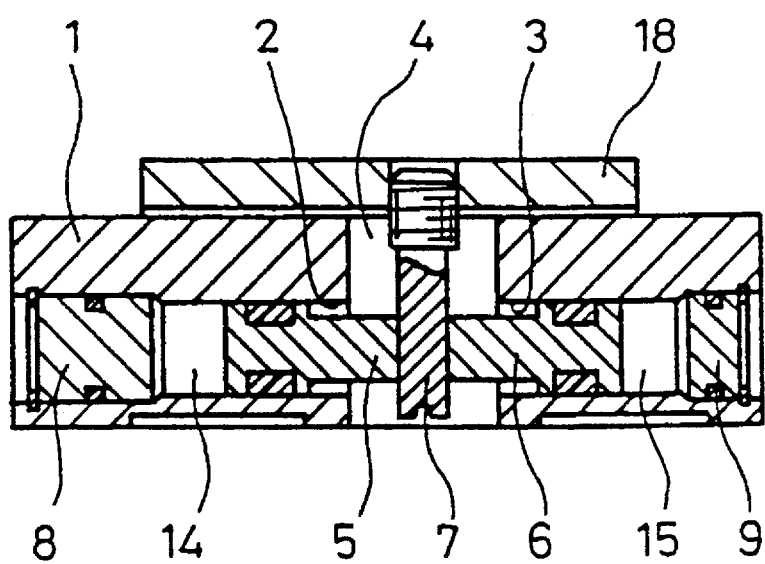
FIG. 19 is a cross-sectional view of a conventional fluid pressure cylinder as a linear actuator.

The linear actuator 150 according to the fourth embodiment of the present invention are substantially the same as the linear actuator 140 according to the third embodiment of the present invention except as follows:

As shown in FIGS. 16 and 17, the linear actuator 150 includes a rail 152 having sensor attachment grooves 116a, 116b and a recess 154 of a triangular cross section which is defined in a side of the rail 152 remote from the sensor attachment grooves 116a, 116b and extends in the longitudinal direction of the rail 152. The linear actuator 150 also has a flat bracket 158 which holds a magnet 156, the flat bracket 158 being fastened by a bolt (not shown) to a side of a slide table 30 which confronts the recess 154. As shown in FIG. 18, the magnet 156, which is substantially in the form of a cylinder, is held so as to be exposed outwardly by a plurality of fingers 160 on the bracket 158.

The magnet 156 whose magnetic fluxes can be detected by the sensors 144a, 144b is mounted on the side of the slide table 30 so as to be exposed toward the rail 152. Furthermore, the magnet 156 is positioned in the recess 154 defined in the rail 152, the magnet 156 is positioned closely to the sensors 144a, 144b mounted in the sensor attachment grooves 116a, 116b defined in the rail 152. As a result, the magnetic fluxes from the magnet 156 can be detected by the sensors 144a, 144b with high accuracy.

The linear actuator according to the present invention offers the following advantages:

The end blocks to which the respective cylindrical members are coupled are inserted in the through hole defined in the actuator body, and the cover members held in surface-to-surface contact with the joint member are held in engagement with the respective cylindrical members. Therefore, the linear actuator can be manufactured relatively easily and inexpensively.

Furthermore, the joint member is integrally coupled to the slide table for increased rigidity, and sandwiched in surface-to-surface contact between the cover members. Even when a large load is imposed on the slide table, the slide table and the joint member remain firmly joined to each other at their junction to which the load is transmitted. Because the joint member 36 and the cover members 76a, 76b are held against each other through relatively large areas of contact, the contact surfaces of the joint member 36 and the cover members 76a, 76b are prevented from being worn rapidly. As a result, the accuracy with which the slide table 30 moves is not lowered in usage over a long period of time, and hence the slide table 30 has large durability. Because the joint member and the cover members are held against each other through relatively large areas of contact, the contact surfaces of the joint member and the cover members are prevented from being worn rapidly. As a result, the accuracy with which the slide table moves is not lowered in usage over a long period of time, and hence the slide table has large durability.

Although certain preferred embodiments of the present invention have been shown and described in detail, it should be understood that various changes and modifications may be made therein without departing from the scope of the appended claims.

What is claimed is:

1. A linear actuator comprising:

an actuator body having a pair of fluid outlet/inlet ports defined in a side surface thereof, a through hole defined axially therein, and an opening defined in an upper surface thereof;

a pair of end blocks coupled to respective axial ends of said actuator body;

a slide table mounted on said actuator body for reciprocating movement axially along the actuator body;

a pair of tubular members coupled to said end blocks, respectively, and having respective passages communicating with said fluid outlet/inlet ports, respectively;

a joint member coupled substantially perpendicularly to a lower surface of said slide table through said opening, for displacement in unison with said slide table;

first and second cover members detached from each other and disposed respectively on opposite sides of said joint member and displaceable into surface to surface contact with said opposite sides of said joint member for moving said slide table, said cover members hermetically sealing outer circumferential surfaces of said tubular members from contact with air; and a pair of pressure chambers defined by said tubular members and said cover members and closed by said cover members, said pressure chambers communicating with said passages in said tubular members.

2. A linear actuator according to claim 1, wherein said actuator body has a guide base projecting upwardly from and integrally formed with the actuator body, said guide base having track grooves for ball bearings.

3. A linear actuator according to claim 1, wherein said tubular members comprise respective cylindrical members.

4. A linear actuator according to claim 1, wherein said end blocks have respective sensor attachment grooves defined in side surfaces thereof.

5. A linear actuator according to claim 1, further comprising displacement adjusting means mounted respectively on said end blocks, for adjusting a displacement of said slide table.

6. A linear actuator according to claim 5, wherein said displacement adjusting means comprise respective adjustment screws or stoppers threaded respectively in said end blocks, for abutting against said slide table at ends of a stroke thereof.

7. A linear actuator according to claim 1, further comprising dampening means mounted respectively on longitudinal ends of said slide table, for dampening shocks produced when said slide table hits said end tables.

8. A linear actuator according to claim 1, further comprising magnets mounted respectively on longitudinal ends of said slide table, for producing magnetic fluxes to be detected to detect a position of said slide table.

9. A linear actuator according to claim 1, wherein said end blocks and said tubular members are integrally formed with each other.

10. A linear actuator according to claim 1, further comprising a rail having sensor attachment grooves defined therein, said rail being selectively and detachably mounted on one of transversely spaced side surfaces of said actuator body.

11. A linear actuator according to claim 10, wherein said rail has a recess defined longitudinally in a side thereof which is remote from the sensor attachment grooves, further comprising a magnet mounted on a side of said slide table by a bracket and positioned in said recess.

* * * * *